(12) United States Patent
Reynolds (10) Patent No.: US 7,724,141 B2
(45) Date of Patent: May 25, 2010

(54) DYNAMICALLY RECONFIGURABLE ANTENNAS FOR RFID LABEL ENCODERS/READERS

(75) Inventor: Matthew Stephen Reynolds, Medford, MA (US)

(73) Assignee: ThingMagic, Inc., Cambridge, MA (US)

( * ) Notice: Subject to any disclaimer, the term of this patent is extended or adjusted under 35 U.S.C. 154(b) by 546 days.

(21) Appl. No.: 11/265,477

(22) Filed: Nov. 3, 2005

(65) Prior Publication Data

US 2007/0040689 A1 Feb. 22, 2007

Related U.S. Application Data

(63) Continuation-in-part of application No. 11/206,914, filed on Aug. 19, 2005, now Pat. No. 7,453,363.

(51) Int. Cl.
*G08B 13/14* (2006.01)

(52) U.S. Cl. .................. 340/572.7; 340/572.1; 343/853; 343/876

(58) Field of Classification Search .............. 340/572.1, 340/572.7; 343/853, 876
See application file for complete search history.

(56) References Cited

U.S. PATENT DOCUMENTS

| | | | |
|---|---|---|---|
| 4,131,839 A | 12/1978 | Springer | |
| 6,195,007 B1 | 2/2001 | Takayama et al. | |
| 6,335,685 B1 | 1/2002 | Schrott et al. | |
| 6,486,832 B1 | 11/2002 | Abramov et al. | |
| 6,819,245 B1 | 11/2004 | Dilling | |
| 6,903,656 B1 | 6/2005 | Lee | |
| 6,989,750 B2 | 1/2006 | Shanks et al. | |
| 2003/0006633 A1* | 1/2003 | Clothier | 297/180.12 |
| 2004/0201539 A1 | 10/2004 | Yewen | |
| 2004/0214642 A1 | 10/2004 | Beck | |
| 2005/0231367 A1 | 10/2005 | Bellantoni | |
| 2006/0238307 A1 | 10/2006 | Bauer et al. | |

FOREIGN PATENT DOCUMENTS

WO WO/96/22545 7/1996

(Continued)

OTHER PUBLICATIONS

Non-patent Reference bibliographic information, where available International Search Report and Written Opinion mailed Nov. 21, 2007 in International Application No. PCT/US2006/026471.

(Continued)

*Primary Examiner*—Tho G Phan
(74) *Attorney, Agent, or Firm*—Choate Hall & Stewart, LLP; John D. Lanza (57) ABSTRACT

A dynamically reconfigurable antenna system for an RFID (Radio Frequency Identification) reader/encoder includes a plurality of antenna elements; and a mechanism constructed and adapted to dynamically and selectively configure said plurality of antenna elements during operation thereof. The antenna elements may be arranged in a pattern of conductive areas, and each antenna element is switchably connectable to ground or to a transmission line connectable to the RFID reader/encoder. Each antenna element may be square, rectangle, circular, or diamond shaped. The antenna elements may located on an inner layer of the multi-layer printed circuit and wherein regions above the antenna elements are a dielectric layer or a slot aperture. The antenna system may be incorporated into an RFID encoder/reader.

27 Claims, 9 Drawing Sheets

FOREIGN PATENT DOCUMENTS

WO  WO 2004/042868  5/2004
WO  WO2005/071790  8/2005

OTHER PUBLICATIONS

International Search Report and Written Opinion mailed May 14, 2008 in International Application No. PCT/US2006/026469.

Padhi S.K. et al: "A dual polarized aperture coupled microstrip patch antenna with high isolation for RFID applications" Jul. 8, 2001, IEEE Antennas and Propogation Society International Symposium, 2001 Digest, APS Boston, MA, July 8-13, 2001 New York, NY: IEEE, US, pp. 2-5, XP010564017. ISBN: 0-7803-7070-8.

\* cited by examiner

DYNAMICALLY RECONFIGURABLE ANTENNAS FOR RFID LABEL ENCODERS/READERS

RELATED APPLICATIONS

This application is related to and claims priority under 35 U.S.C. § 120 to U.S. patent application Ser. No. 11/206,914, titled "RFID reader system incorporating antenna orientation sensing" filed Aug. 19, 2005, which is commonly owned with the present application at the time of filing, the entire contents of which are incorporated herein by reference.

FIELD OF THE INVENTION

This invention relates to RFID ("Radio Frequency Identification") labels or tags and, more particularly, to reconfigurable antennas for RFID label encoders, along with devices incorporating same.

DETAILED DESCRIPTION OF PRESENTLY PREFERRED EXEMPLARY EMBODIMENTS OF THE INVENTION

BRIEF DESCRIPTION OF THE DRAWINGS

The invention is better understood by reading the following detailed description with reference to the accompanying drawings in which.

DESCRIPTION

This invention relates, in some aspects, to RFID labels (also called "tags"), RFID label encoder-applicators and print-apply machines, RFID-enabled label printers, and other machinery or devices in which RFID labels are encoded with information. In the description that follows, the term RFID encoder refers generally to a device or mechanism that can encode information in an RFID tag or label. An RFID encoder may be incorporated, for example, into a device such as a printer or the like that, in addition to encoding information in RFID tags, prints information on the tags.

In some of these encoder/printer applications, RFID labels are provided on a roll of physically identical labels. In other applications, the RFID labels are provided in sheets that may be fed through a sheet-feeding mechanism.

Most RFID labels have a read/write memory that can be programmed at the time of use, rather than at the time of manufacture. These labels, as they are provided on a roll or sheet of labels, may be blank, partially programmed, or programmed with manufacturing test data. Accordingly, typically at least one encoding step is required before an RFID label is useful for identifying an object to which it will be applied. An RFID reader/writer, and its attendant antenna, are therefore required to perform this encoding step.

Figure 1A:
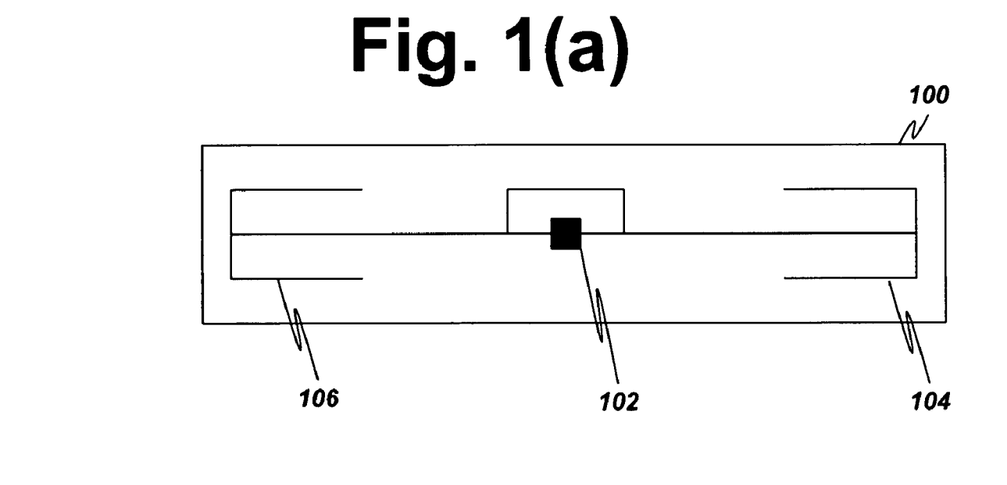
FIGS. 1(a)-1(b) depict two types of RFID label types.
Figure 1B:
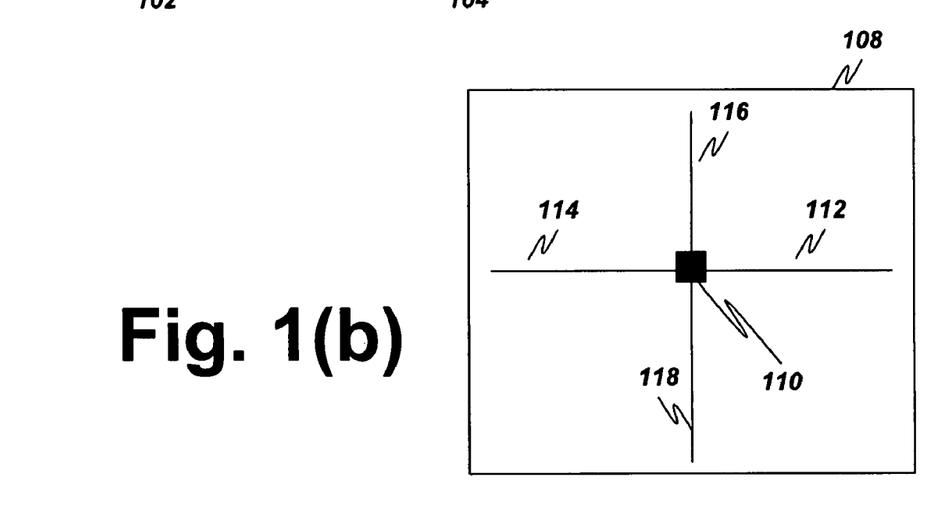

A wide variety of different types of RFID labels that vary in their choice of integrated circuitry, shape, size, or electromagnetic performance have been developed to deal with the varied application scenarios for RFID labels. Due to rapid growth in RFID applications, there is a corresponding proliferation of different label antenna types. For example, two different label types are shown in FIGS. 1(a)-1(b). Label type-I, denoted 100 in FIG. 1(a), has an integrated circuit (IC) 102 connected to two antenna elements 104, 106. Label type-II, denoted 108 in FIG. 1(b), has an IC 110, electrically connected to a number of antenna elements (in the example shown, there are four antenna elements, denoted 112, 114, 116, 118). Some RFID labels may have folded-dipole type antenna elements, while others may have inductively loaded dipole elements or patch elements. Because it is often desirable to produce orientation-independent labels, there may be more than one antenna element on the label, connected to the tag's circuitry, as shown in the example of FIG. 1(b).

The desire to minimize waste material on a roll or sheet of tags and, accordingly, to place each label close to the next on the roll or sheet, and to enable smaller labels, results in different rolls or sheets of labels having a different tag-to-tag "pitch" or inter-tag spacing. Furthermore, in the case of complex roll-fed or sheet-fed label forms, there may be more than one tag present on the same portion of the label medium. This is most often the case when a sheet-fed multipart form is produced, although it may also apply to roll-fed applications. In such cases the inter-tag spacing may vary between any two regions on the same form, or between a tag on one form and a tag on adjacent form, and additionally, the orientation of each tag may be different from the next. For example, on a multipart form of two parts, one tag may be oriented horizontally with respect to the direction of label travel through the printer or encoder, while another may be oriented vertically with respect to the direction of label travel. It should be appreciated that labels may also be interspersed with each other for certain specialized applications, as when a smaller label is partially or wholly contained within a larger label. In such cases, if the tags disposed on the labels have different antenna types, one tag may be substantially surrounded by another tag.

In many conventional RFID-enabled label encoders, a single, fixed-configuration encoder antenna (also called a "near field coupler") is used within close proximity of the label to encode a wide variety of RFID labels, regardless of the type and nature of the antenna used on the label. This single, fixed-configuration encoder antenna poses a problem when the RF field surrounding the antenna does not properly excite the label's antenna, or when the encoder antenna's field reaches beyond a single label to excite multiple labels simultaneously. The latter is a particular problem when attempting to encode labels that contain RFID tag integrated circuits that employ communication protocols that do not distinguish among labels when performing the encode operation. In this case, if two such labels are present in the field surrounding the encoder's antenna, as often happens in the case of adjacent labels, they may both be programmed simultaneously, even if the user's intent was to encode only one label.

Figure 2:
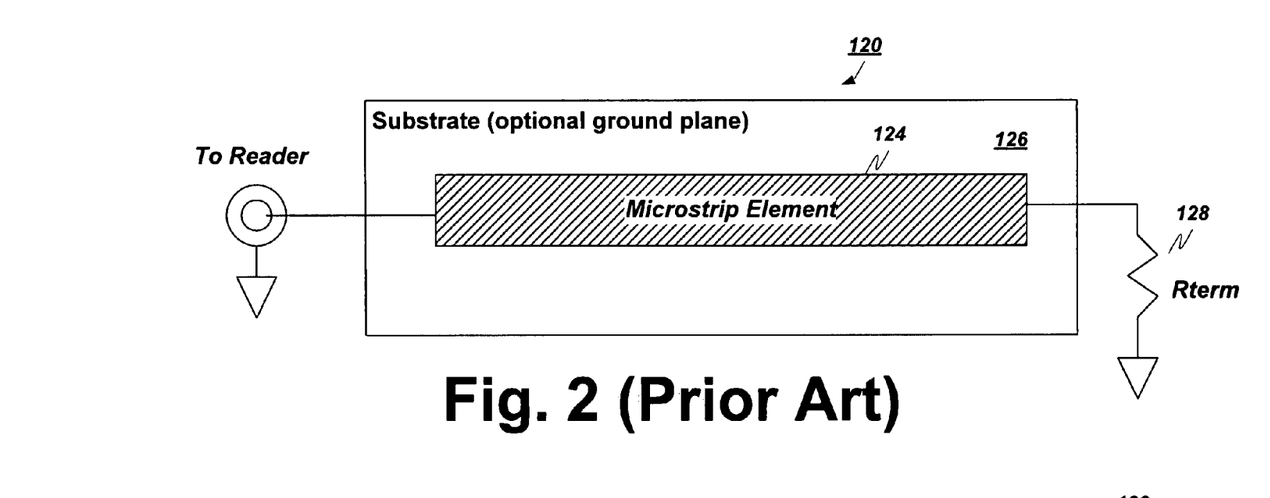
FIGS. 2-3 show conventional fixed-configuration encoder antennas.
Figure 3:
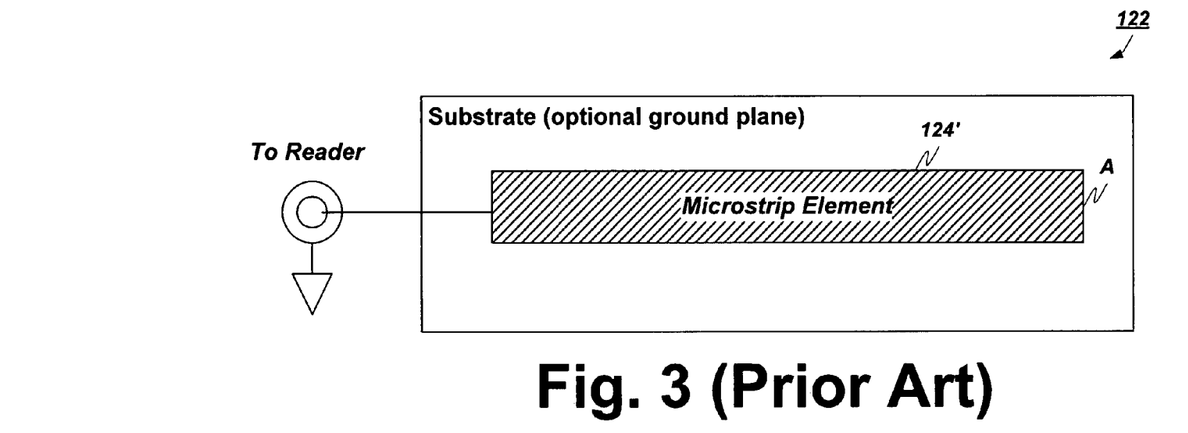

Two different types of fixed-configuration encoder antennas 120, 122 are shown in FIGS. 2 and 3. In both cases there is a single coupling element (microstrip) present on an antenna substrate. In the Type-I example shown in FIG. 2, this coupling element 124 may comprise a copper region on a printed circuit board 126. This copper region 124 is fed with the RF signal from an attached RFID reader, and a wave is coupled along the length of the copper region, before being terminated in resistor 128, (also denoted Rterm). In FIG. 3 another type of encoder antenna, Type-II 122, is shown consisting of an unterminated coupling element 124'. In this Type-II case, an open circuit is present at the far end (A) of the copper region 124', and a reflection or standing wave is introduced along the copper region. In both Type-I and Type-II single element antennas, the traveling or standing wave present on the microstrip element results in an electric field gradient in the region of space near to the element, which couples capacitively into an RFID label's antenna when the label is proximate.

In one aspect, this invention provides an RFID encoder antenna that can be dynamically reconfigured to properly excite many different types of RFID labels. In another aspect, this invention provides an RFID encoder antenna that can be used to selectively excite one label without exciting an adjacent label, even though there may be many different label pitches and/or orientations.

In some aspects, this invention comprises of a multiple-element near-field antenna, as contrasted with the conventional single-element near-field antennas. Each element of an antenna according to embodiments of the invention can be configured to couple signals from an associated transmission line, resulting in the formation of a localized electric field, a localized magnetic field, or it can be grounded to provide a localized ground reference. As these regions of electric or magnetic field are controlled by the switching logic, a configurable excitation field results.

In other aspects, the antenna elements of this invention may be employed in a far-field antenna mode, wherein each antenna element radiates an electromagnetic wave that propagates to one tag without exciting an adjacent tag. In these cases, the antenna elements of this invention are of substantially the same type as those disclosed herein but their far-field behavior is employed rather than their near-field behavior. Both types of signal coupling are explicitly contemplated herein.

In some preferred embodiments of the present invention, the structure of the antenna is a multi-layer printed circuit making use of microstrip transmission lines and etched antenna element regions, although it may alternatively be made of a single- or two-layer printed circuit containing only the radiating elements, which are then connected to the switching circuitry by means of coaxial or other standard transmission line types as are well known in the art. Suitable multi-layer printed circuit materials include, e.g., the industry-standard FR4 material. Alternatively specialty microwave circuit substrates such as FR-408 material made by Isola Laminate Systems (Arizona, U.S.A.), or RO-4000 material made by Rogers Corporation (Connecticut, U.S.A.) may be employed. The latter dielectric materials, although more costly than FR4 material, have the advantages of better controlled dielectric properties (dielectric constant) as well as lower loss tangent and better dimensional stability over temperature and under mechanical stress. It should be understood that this invention also contemplates the use of alternative dielectric materials such as air, glass, plastics or foam. Furthermore, the conductive elements may be constructed of any conductor, such as aluminum, brass, copper, or other sheet metals, or conductive inks or paints such as silver loaded conductive ink. Still further, the structure of conductors and dielectrics may be laminated together as in the case of a printed circuit board, or the antenna structure may be comprised of separate layers that are held together with fasteners such as spacers, rivets, screws and the like.

Figure 4:
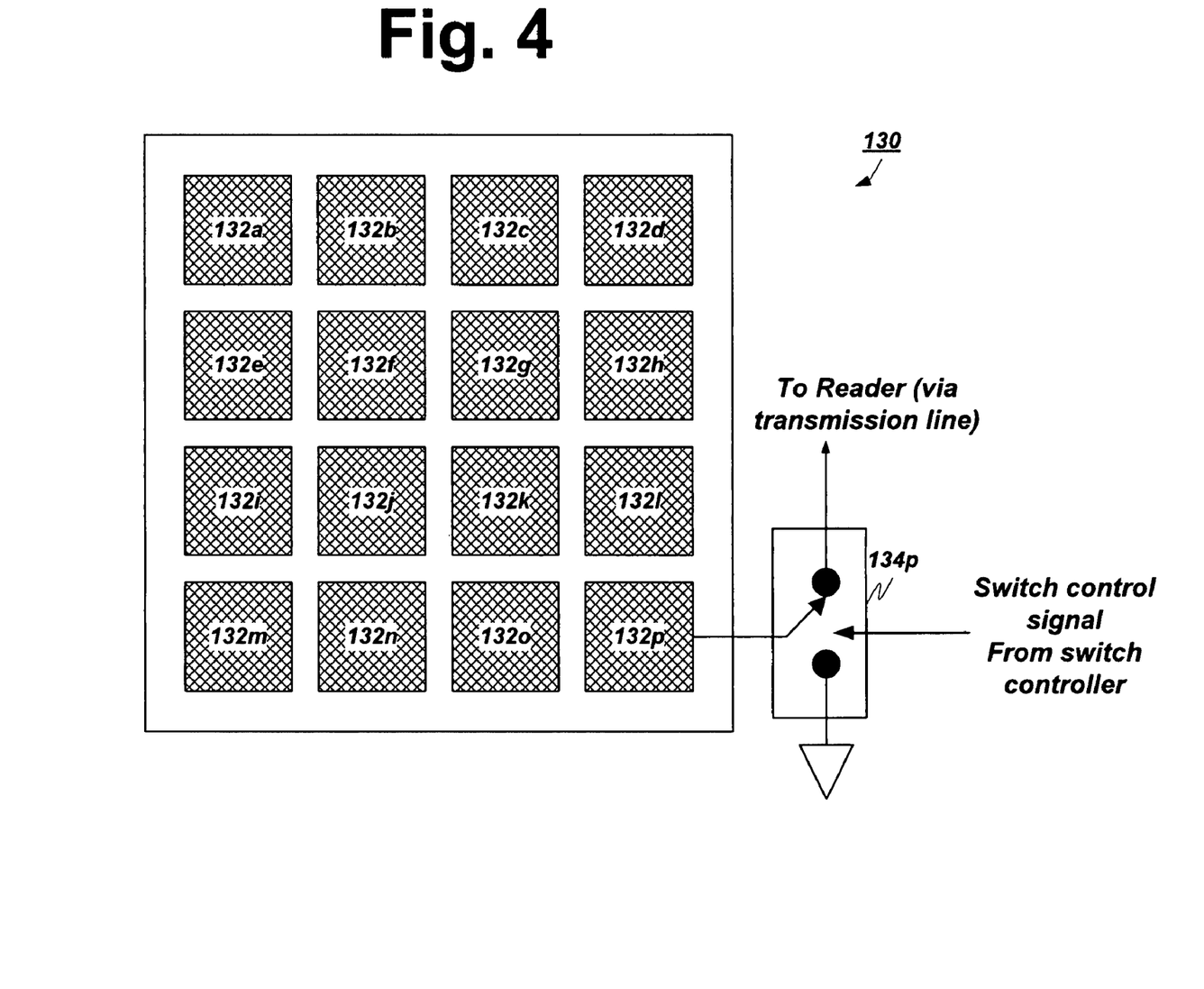
FIG. 4 shows a first type of configurable encoder antenna according to embodiments of the present invention.

The pattern of the antenna element regions according to preferred embodiments of the invention may be one of two types. FIG. 4 shows a first type, Type-I, antenna 130 according to embodiments of the invention. In the Type-I, antenna, an example of which is shown in FIG. 4, the antenna elements are isolated conductive areas on a layer of the antenna structure. These antenna elements may be formed, e.g., as isolated copper regions on a layer of a multi-layer printed circuit (PC). In some embodiments, the antenna elements may be formed on the top layer of the PC, while in some other embodiments, the antenna elements may be located on an inner layer of the multi-layer printed circuit. In these latter cases, the region above the elements is preferably a dielectric layer or a slot aperture rather than an uninterrupted ground plane.

In the example Type-I system shown in FIG. 4, the sixteen antenna elements 132a~132p form a four-by-four grid of substantially square-shaped conductive areas, each of which is connectable via a switch to ground or to an RFID encoder/reader. Although only one switch 134p is shown in FIG. 4 (corresponding to antenna element 132p), those of skill in the art will understand that each element is connected to a switch. In some embodiments, the elements may be grouped so that more than one element is connected to the same switch. In other embodiments, each element may have its own switch.

In general, in a Type-I embodiments of the present invention, antenna elements are preferably arranged in a regular repeating pattern, such as a grid of square, rectangular, circular, or diamond-shaped conductive areas (or slot apertures), each of which is connected via a switch either to a transmission line or to ground. This type of antenna element arrangement is quite flexible because it allows a fine granularity of field geometry selection, and allows for tag antennas of widely varying size and shape to be properly excited by the encoder's RF field. In general, if there are N antenna elements, there will be between one and N switches. Although the number of elements and switches is not limited, presently preferred values of N are 2, 3, 4, 5 and 6, and presently preferred element shapes are squares and rectangles. Further, preferred embodiments have a one-to-one relationship between switches and antenna elements (i.e., in preferred embodiments, each antenna element has its own switch).

In a presently preferred implementation of a Type-I antenna system according to the present invention, there are four square-shaped antenna elements formed in a two-by-two grid, each element having its own switch.

In Type-II antennas according to embodiments of the present invention, the antenna elements are predetermined shapes that are designed to excite certain commonly used types of RFID label antennas. For example, the antenna elements may be configured as a group of dipoles of varying sizes or shapes to better accommodate dipole-type label antennas. Alternatively the antenna elements may be a mixture of dipole, folded dipole, triangular, slot, leaky microstrip, patch, or slot elements as desired to achieve excitation of various label types. Alternatively the antenna elements may also be comprised of shapes that produce grounded regions of varying size to better separate one tag from its neighbors by minimizing the RF field outside a desired region.

Figure 5:
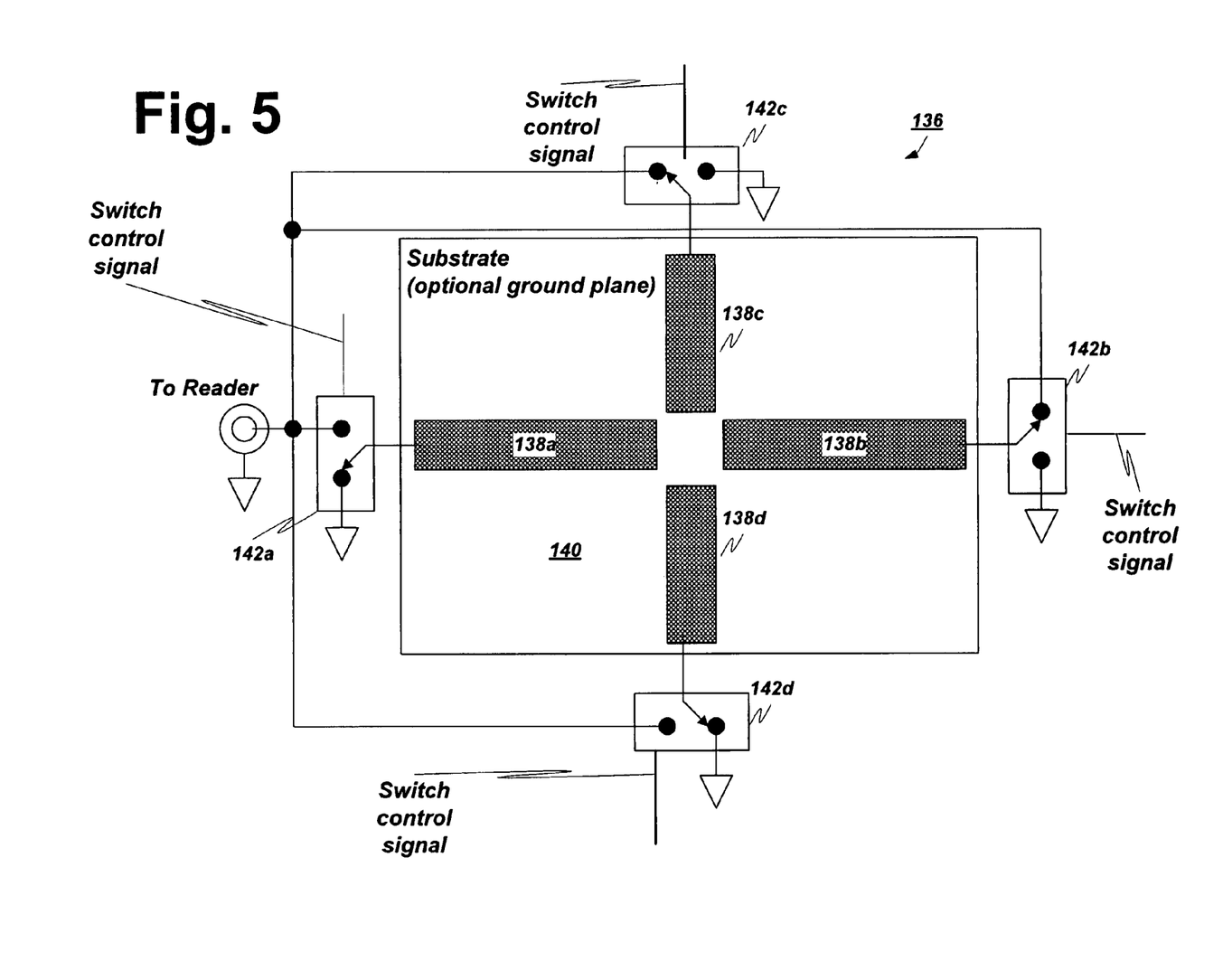
FIG. 5 shows another type of configurable encoder antenna according to embodiments of the present invention.

In the exemplary embodiment of a Type-II antenna, as shown in FIG. 5, the antenna 136 includes four rectangular antenna elements 138a~138d, formed on (or in) a substrate 140. Each element is connected to a respective switch 142a~142d, each of which can connect to a reader/encoder or to ground. In general, if there are N antenna elements, there will be between one and N switches.

It should be further appreciated that, in addition to being directly fed by means of an ohmic electrical connection, the antenna elements may themselves be parasitically or capacitively fed, as by excitation from a radiating transmission line or slot located in proximity to the antenna element. Alternatively the antenna element itself may be a slot aperture in a conductive plane, rather than an isolated conductive region, as is this is well known to be the dual of the conductive element itself.

Figure 6:
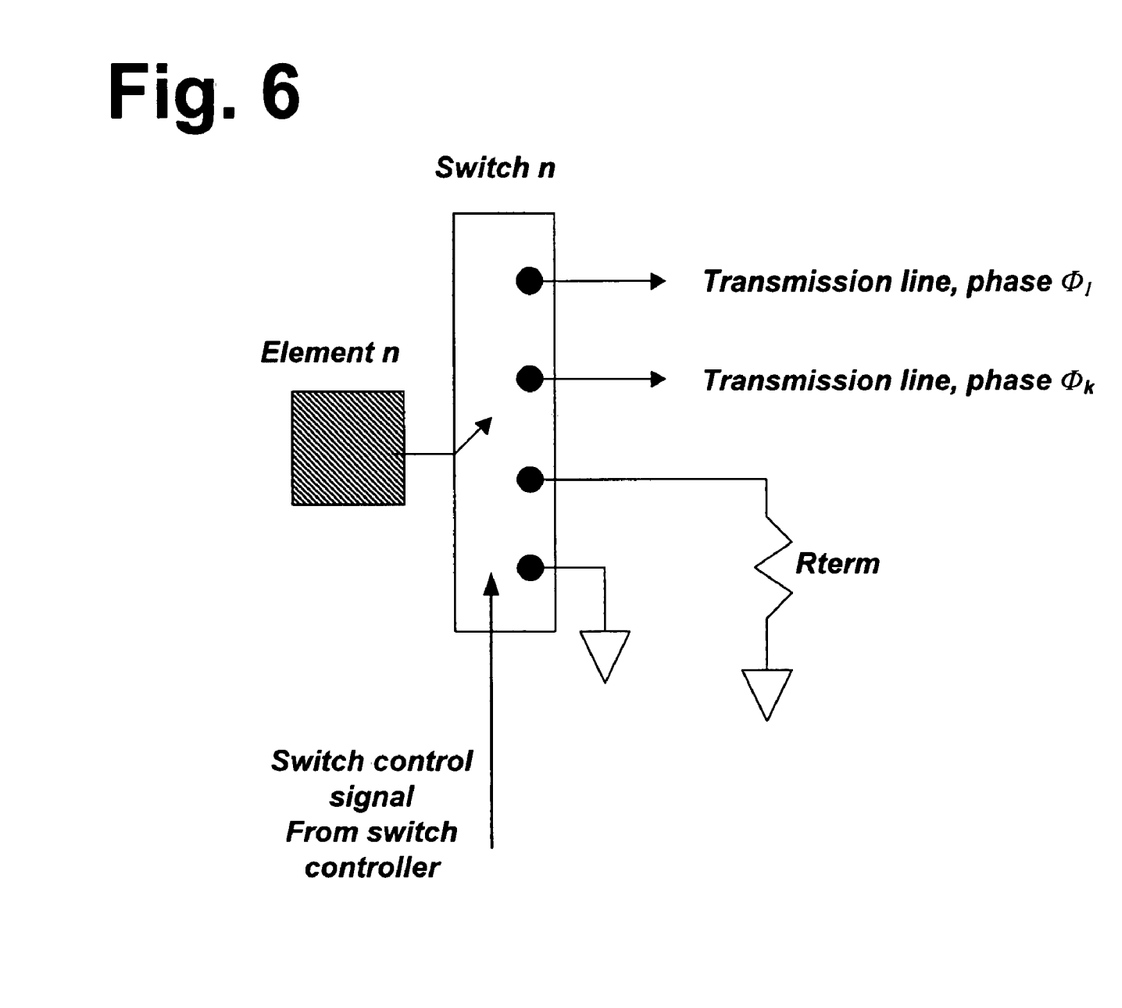
FIG. 6 shows a configurable antenna controller according to embodiments of the invention.

The switches employed in some embodiments of this invention may be silicon or gallium arsenide RF switches such as, e.g., the NEC UPG152TA or Analog Devices ADG936 CMOS switches, or the M/A-Com MASWSS0006 gallium arsenide FET switch. RF relays such as microelectromechanical switches (MEMS) may also be employed where the switching losses of silicon or GaAs switches are too high. The drive signals for the switches are obtained from a controller (e.g., as shown in FIG. 6) which may either be comprised of fixed logic (either combinational logic or a state machine), or a microprocessor that employs software to select combinations of active antenna elements according to predetermined or dynamically determined patterns of local field.

In one aspect, this invention uses a predefined look-up table to determine a proper setting of the RF switches to create a desirable excitation field profile for a given tag type and/or tag orientation. These settings may be determined, e.g., through the use of RF simulation software such as, e.g., Agilent Technologies' High Frequency Structure Simulator (HFSS), or by employment of an optimization function or genetic algorithm to determine the proper configuration of switches to produce the most desirable field profile for a given antenna configuration for a given tag type. Once determined, the look-up table may be stored as hard-wired combinational logic, embodied as a finite state machine, or stored in RAM or Flash memory as when it is embodied as a software program running on a processor.

Figure 9A:
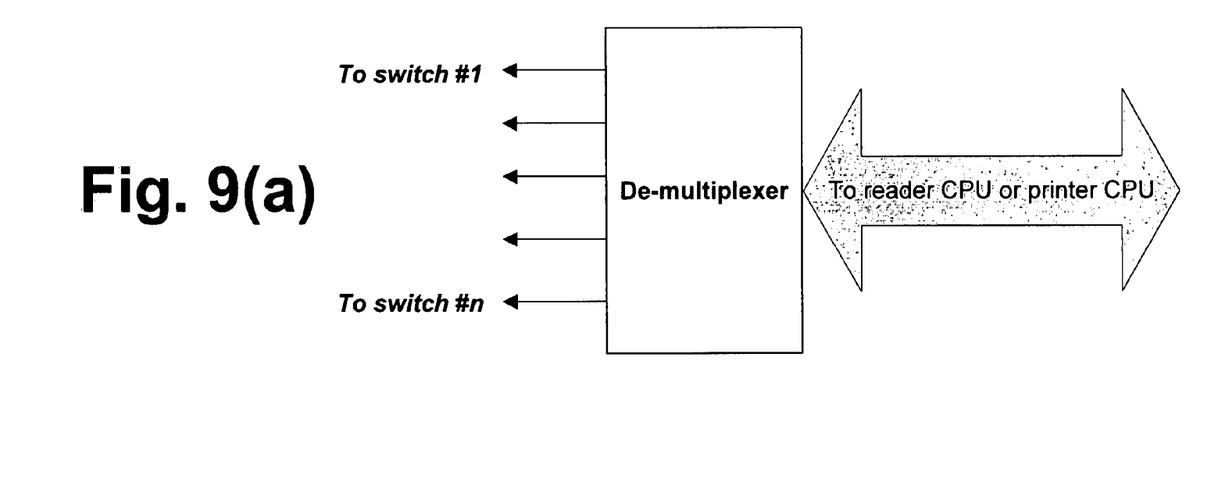
FIGS. 9(a)-9(b) show antenna controllers according to embodiments of the present invention.

In one presently preferred implementation, as shown in FIG. 9(a), the controller is a TMS320VC5502 digital signal processor supplied by Texas Instruments, Inc. which uses its serial peripheral interface (SPI) bus interface to drive a serial-to-parallel converter which thus drives an array of M/A-Com MASWSS0006 gallium arsenide FET switches.

Figure 9B:
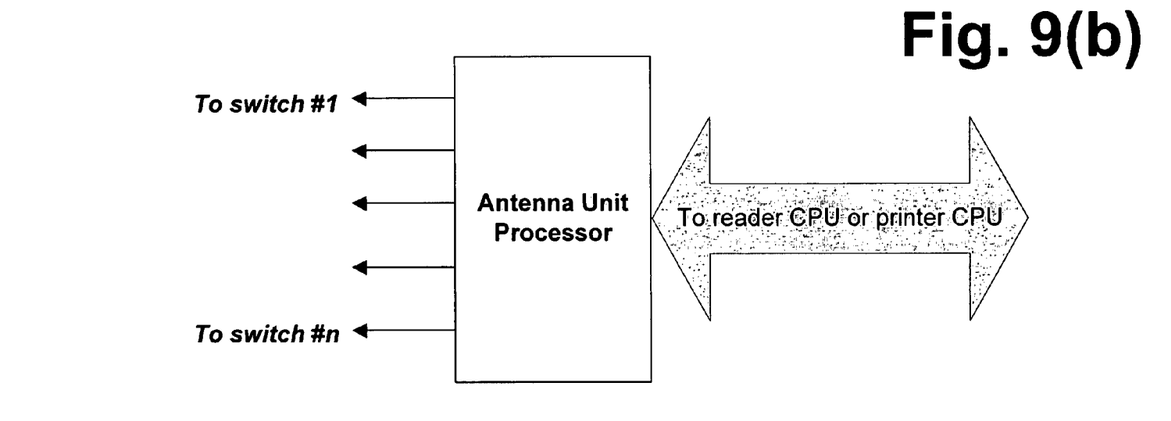

In another preferred implementation, as shown in FIG. 9(b), the controller is a PIC16F877 microprocessor supplied by Microchip Inc. which uses its general purpose I/O (GPIO) pins to drive an array of M/A-Com MASWSS0006 gallium arsenide switches. The control information is supplied to the microprocessor from an attached ThingMagic Mercury4e RFID reader module by means of an RS-232 serial connection. In present exemplary embodiments, these control messages may take one of two forms. In one form, the control message is a specific directive from the RFID reader module to open or close certain of the attached switches. In another form, the control message is a pointer to a structure of tag types that is stored in the PIC16F877 microprocessor's memory. This pointer is effectively an indication of the label type to be read or written, although there may not be a one-to-one correspondence between the label type indicator sent via this connection. Instead, the pointer may reference an abstraction of the desired RF field profile to be generated by the antenna unit under the control of the controller. In this way a selection of a desired RF field profiles from a library of such profiles may be made in order to accommodate variations in RFID tags as may occur subsequent to the initial design of the antenna system.

In another aspect, this invention may make use of a dynamic optimization in which an iterative or randomized search is made through many possible switch configurations in order to maximize a certain variable, e.g. the number of times the desired tag is read (or written) without exceeding a certain threshold in the number of times that an adjacent tag is read (or written). This determination may be made once when a roll or sheet of tags is first inserted into the RFID label encoder, and the same determination may stored, e.g., in a cache memory, for use throughout the time that a particular label type is being encoded in the encoder. The optimization may be performed on the RFID reader/writer's processor, on the antenna controller's processor, or the optimization task may be split between the two processors.

Figure 10:
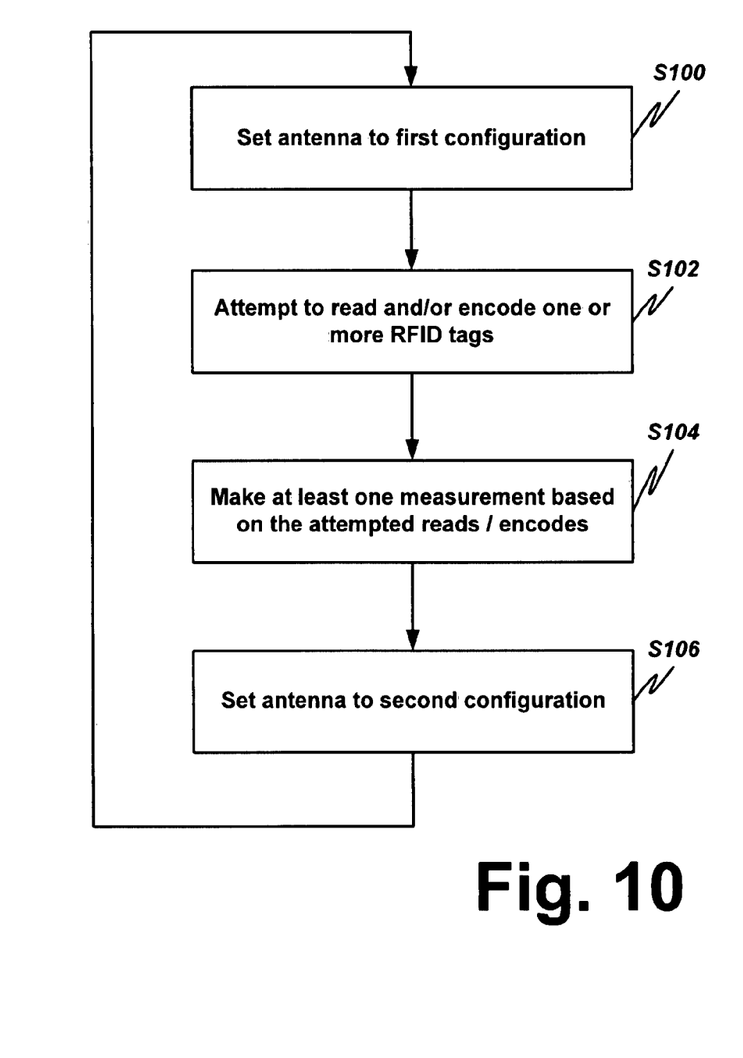
FIG. 10 is a flowchart showing operation of one aspect of embodiments of the present invention.

In some embodiments, an RFID reader/encoder according to embodiments of the present invention may configure a dynamically reconfigurable antenna system as follows, with reference to the flowchart in FIG. 10: first, the antenna is set to a first configuration (at S100). With the antenna in the first configuration, the reader/encoder attempts to read and/or encode one or more RFID tags (at S102). The reader makes at least one measurement based on the attempted reads/encodes (at S104). Based at least in part on these measurements, the reader/encoder sets the antenna system to a second configuration (at S106). In some embodiments, this process is repeated for multiple possible configurations of the dynamically configurable antenna. The measurements may be, e.g., (a) a number of successful read and/or failed attempts to read or encode said one or more RFID tags, and/or (b) a tag signal strength, and/or (c) a frequency of a tag response, and/or (d) one or more tag data bits.

The configurations may be determined by a computer program executing on a processor, they may be extracted from a database of configurations or they may be input or determined in some other manner. In some embodiments of the present invention, the configurations are determined by a finite element or harmonic balance simulation.

Additionally, information from the label stock itself may be used to configure the antenna unit described herein. This information may be, for example, an alpha-numeric code entered by the user of the label encoder based on information shown on the label itself or packaging of the label stock. Alternatively (or in addition), a bar code or other automatic identification symbology may be read from either the label itself or its packaging and used to select a field profile to be employed by the antenna unit. In one preferred embodiment a small mark (e.g., an ink mark) is printed upon the label stock to indicate the relative position of the tag antenna along the length of the label stock. In this case the mark is detected by means of a photodetector and the input from that photodetector is used to determine the field profile to be employed preferentially for encoding the label. In another embodiment, the software that is used to design the printed graphics for a multi-part form also communicates the tag types, orientation, and locations for that form to the label printer/encoder, which then configures the multi-element antenna disclosed herein to properly encode each of the different tags present on the multi-part form. This information is communicated from the form design software to the label printer-encoder, e.g., by means of data structures embedded in Postscript, PDF, PCL, HPGL, or other printer control languages well known in the computing art.

Those skilled in the art will realize that information used to configure an antenna unit may take many forms, and that various forms may be used alone or in combinations. For example, a bar code on a label itself may be used in conjunction with a user input. When more than one form or source of information is provided, a hierarchy may be imposed in order to resolve conflicts in the information. For example, a code or mark on the stock itself may override a user-input code or a code on some packaging.

Control signals may also be transferred to the antenna controller through a separate digital interface with their control logic, such as via a synchronous serial bus such as I2C or SPI, or via a standard serial transport such as RS-232, via USB or an Ethernet network, or via any other digital interface mechanism as is known in the art. Alternatively, the control signals and/or the power needed to run the antenna unit may be multiplexed with the RF connection from the encoder module to the antenna itself, through the use of a DC block and bias tee connection. This may also provide power to operate the switches and associated control logic. Further, the control signals may be communicated via the amplitude, frequency, or phase of the RF signal itself from the reader, as extracted at the antenna unit. This implementation has the advantage that no additional cables beyond the RF interconnecting cable are needed.

Figure 7:
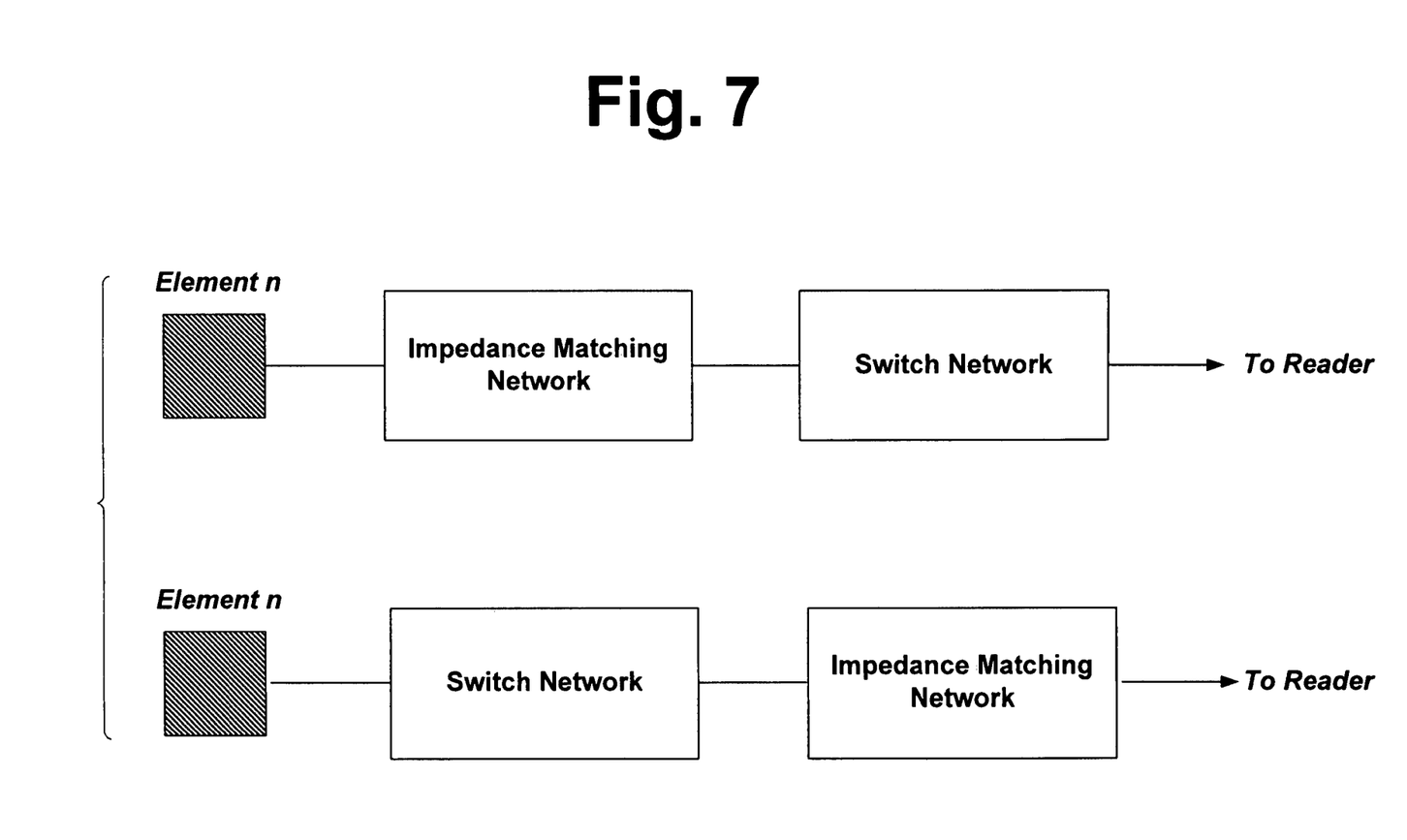
FIG. 7 shows an exemplary switch arrangement according to embodiments of the present invention.

The transmission lines shown may take any form known in the art, including microstrip, buried microstrip, or coplanar waveguide types, in the case of planar transmission lines. Alternatively, a coaxial transmission line or a waveguide may also be employed. To provide a good RF impedance match between the transmission line and the antenna element, and to avoid RF reflections, a terminating switch may be employed which would produce a constant impedance on the attached transmission line regardless of whether a given antenna element is connected or disconnected at any given time. Such a terminating switch may be, e.g., a Hittite Microwave Corp. HMC336 or any number of others that are now common in the RF industry. In this case, the transmission line is always properly terminated regardless of whether the antenna element is connected or not. An example switching arrangement for one embodiment of this invention is shown in FIG. 7. This switching arrangement permits a given element (element n in the drawing) to be selectively connected to ground, to a terminating impedance Rterm, or to one of two transmission lines carrying excitation signals of differing phases (phase $\Phi_j$ and $\Phi_k$). The latter connection allows for a larger field gradient to be generated between two elements than is possible with only single-phase excitation of array elements.

Figure 8:
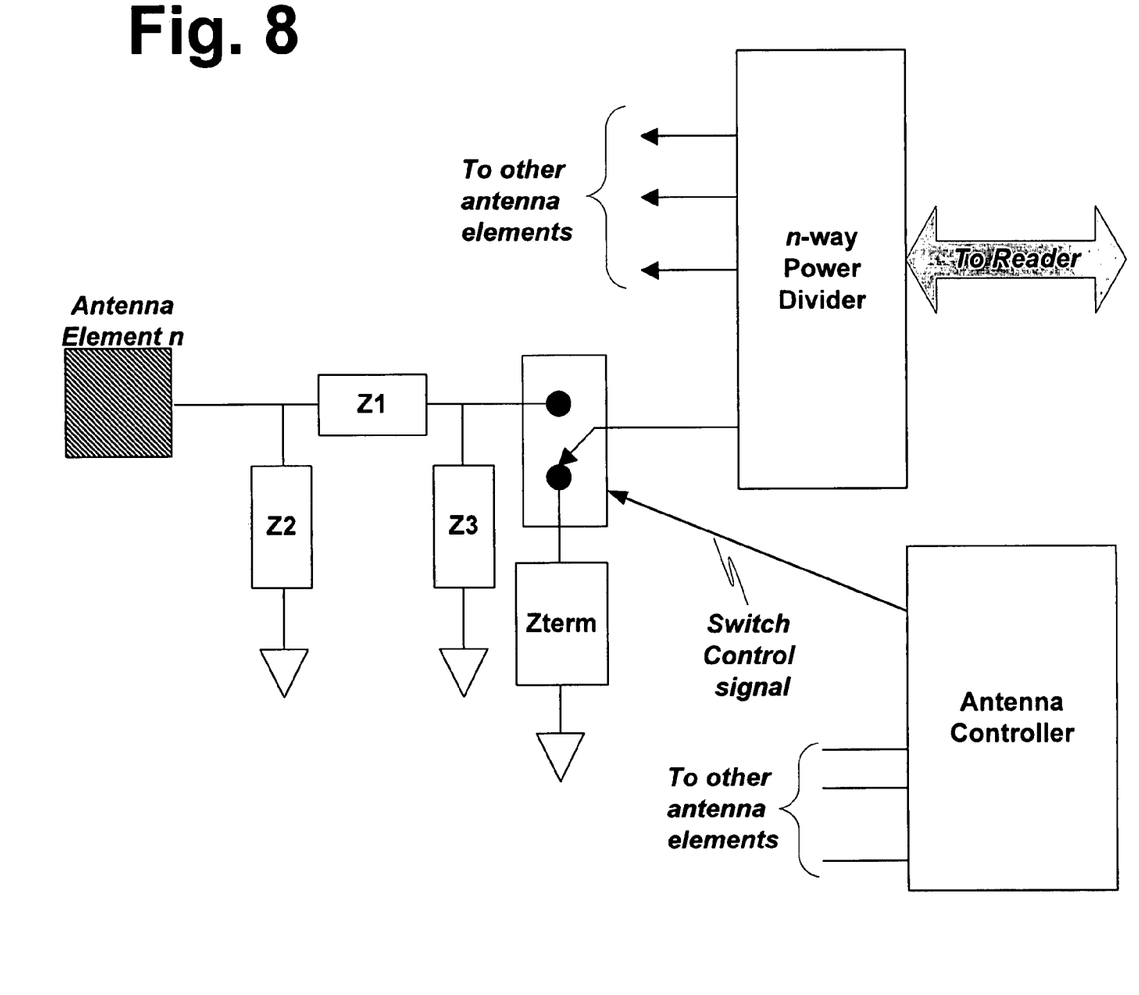
FIG. 8 shows an element circuit showing impedance matching elements.

Furthermore, in the service of impedance matching, each antenna element may be considered as one plate of a parallel plate capacitor, with the other plate being formed by an adjacent ground plane. In this case, a resistor may be added between each antenna element and ground to serve as the real part of a terminating complex impedance. Then, a simple matching network consisting of a tuned transmission line and/or one or more lumped elements such an inductor may be added in series or parallel with the resistor so that the resulting element impedance is well matched to the transmission line feeding it. The determination of the proper value of terminating resistance and matching impedance may be made in consideration of the geometry of the encoder antenna and any surrounding conductive elements that might be part of the encoder apparatus. Such a matching network is shown in FIG. 8. Impedances Z1, Z2, and Z3 are made up of resistors, capacitors, or inductors allowing the inherent capacitance of the antenna element itself to be matched to the characteristic impedance of the source transmission line. As shown in the example in FIG. 8, the switch may also be connected in a manner that presents a constant impedance Zterm to the source transmission line regardless of whether the antenna element is connected or disconnected, by virtue of connection of the transmission line to terminating impedance Zterm.

Alternatively, RF impedance matching from the switch network to the antenna element may be facilitated by means of distributed matching, such as by inductively loading the element, or by selecting a feedpoint on the element that is not along its edge, for example by means of a via attaching to the feedpoint, or by insetting a feeder transmission line within the periphery of the antenna element to reach a point of desirable feed impedance.

Thus are described reconfigurable antennas for RFID label encoders. Those skilled in the art will realize that antennas according to embodiments of the present invention may be included into any type of device. Those skilled in the art will particularly realize that the antenna according to embodiments of the invention is useful to manufacturers of label printers, label applicators, multi-part forms printers, and print/apply machines and the like. Accordingly, in another aspect, this invention is an RFID encoder including one or more antennas according to embodiments of the invention. In yet another aspect, this invention is an RFID label printer or print/apply machine incorporating one or more antennas according to embodiments of the invention.

While various types of switches have been described, those of skill in the art will know and understand that different types of switches will respond at different rates. The switches can be of any appropriate kind, including an FET switch, an electromechanical or microelectromechanical switch, a diode switch, a phototransistor switch, and the like.

Similarly, while various controllers have been described, those of skill in the art will know and understand that different types of controllers may be used, including microprocessors, digital signal processors (DSPs), general purpose processors, combinational logic arrays, a finite state machines and the like.

The antenna systems described herein are dynamically and selectively reconfigurable. As used herein, the term "dynamically" as it applies to configurable or reconfigurable means that the various antenna elements of an antenna system may be configured or reconfigured at and/or before and/or during the time of use (for reading and/or encoding). As used herein, as it applies to configurable or reconfigurable, the term "selectively" means that some or all of the various antenna elements of an antenna system may be configured or reconfigured. Those of skill in the art will understand that a particular antenna system may be configured in one way for a particular operation (read or encode) and then reconfigured in a different way for a subsequent operation (read or encode).

Those skilled in the art will understand that the dynamically reconfigurable antenna systems according to embodiments of the present invention may be selectively and/or dynamically configured for reading and/or encoding of RFID tags.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A dynamically reconfigurable antenna system for an RFID (Radio Frequency Identification) reader/encoder, the antenna system comprising:
   a plurality of antenna elements; and
   a configuring mechanism constructed and adapted to dynamically and selectively configure said plurality of antenna elements, wherein more than one antenna element is simultaneously connected to the RFID reader/encoder, and wherein the plurality of antenna elements are arranged in a pattern of conductive areas, and wherein each antenna element is selectively and dynamically connectable via a switch to ground or to a transmission line connectable to the RFID reader/encoder.

2. An antenna system as in claim 1 wherein each antenna element is selectively and dynamically switchable to one of: ground, a terminating impedance, or one of two transmission lines carrying excitation signals of differing phases.

3. An antenna system as in claim 1 wherein the pattern is a regular repeating pattern.

4. An antenna system as in claim 3 wherein the antenna elements are arranged in a grid.

5. An antenna system as in claim 3 wherein the antenna elements are arranged as a grid of square-shaped elements.

6. An antenna system as in claim 1 wherein each antenna element has a shape selected from the group comprising: squares, rectangles, circles, and diamond shape.

7. An antenna system as in claim 1 comprising sixteen square antenna elements arranged in a grid.

8. An antenna system as in claim 1 comprising:
four separate rectangular antenna elements arranged in a cross shape on a rectangular region of a layer of an antenna substrate; and
four switches, each connectable to the RFID encoder/reader, and each operable to switch a corresponding one of the antenna elements between ground and the RFID encoder/reader.

9. An antenna system as in claim 1 wherein the antenna elements are formed as isolated conductive areas on a layer of a substrate.

10. An antenna system as in claim 9 wherein the layer is a top layer of the substrate.

11. An antenna system as in claim 9 wherein the antenna elements are located on an inner layer of the multi-layer printed circuit and wherein regions above the antenna elements comprise a dielectric layer or a slot aperture.

12. An antenna system as in claim 1 wherein the antenna elements are formed as isolated conductive areas on a layer of a multi-layer printed circuit (PC).

13. A dynamically reconfigurable antenna system for an RFID Radio Frequency Identification reader/encoder, the antenna system comprising:
a plurality of antenna elements; and
a configuring mechanism constructed and adapted to dynamically and selectively configure said plurality of antenna elements, wherein more than one antenna element is simultaneously connected to the RFID reader/encoder, and wherein the configuring mechanism comprises:
a plurality of switches for selectively switching at least some of said antenna elements to a transmission line or to ground.

14. An antenna system as in claim 13 each of said switches is selectively switchable to one of: ground, a terminating impedance, and one of two transmission lines carrying signals of differing phases.

15. An antenna system as in claim 13 wherein there are N antenna elements and N switches.

16. An antenna system as in claim 15 wherein N is 2, 3 or 4.

17. An antenna system as in claim 13 wherein the antenna elements are formed as isolated conductive areas on a layer of a substrate.

18. An antenna system as in claim 17 wherein the layer is a top layer of the substrate.

19. An antenna system as in claim 17 wherein the antenna elements are located on an inner layer of the multi-layer printed circuit and wherein regions above the antenna elements comprise a dielectric layer or a slot aperture.

20. An antenna system as in claim 13 wherein the antenna elements are formed as isolated conductive areas on a layer of a multi-layer printed circuit (PC).

21. An antenna system as in claim 13 comprising sixteen square antenna elements arranged in a grid.

22. A method of operating an RFID reader/encoder, the method comprising:
(A) providing a dynamically reconfigurable antenna system comprising:
(a1) a plurality of antenna elements; and
(a2) a configuring mechanism constructed and adapted to dynamically and selectively configure said plurality of antenna elements; and
(B) dynamically configuring the antenna system by selectively configuring at least some of the antenna elements prior to or during operation of the RFID reader/encoder,
wherein more than one antenna element is simultaneously connected to the RFID reader/encoder, and
wherein the plurality of antenna elements are arranged in a regular repeating pattern of conductive areas, and wherein each antenna element is connectable via a switch to ground or to a transmission line connectable to the RFID reader/encoder.

23. A method as in claim 22 wherein the antenna elements are arranged in an N×N grid of square-shaped elements formed as isolated conductive areas on a layer of a substrate.

24. A method as in claim 23 where the value of N is 2, 3 or 4.

25. A method of operating an RFID reader/encoder, the method comprising:
(A) providing a dynamically reconfigurable antenna system comprising:
(a1) a plurality of antenna elements; and
(a2) a configuring mechanism constructed and adapted to dynamically and selectively configure said plurality of antenna elements and
(B) dynamically configuring the antenna system by selectively configuring at least some of the antenna elements prior to or during operation of the RFID reader/encoder,
wherein more than one antenna element is simultaneously connected to the RFID reader/encoder, and
wherein there are four rectangular antenna elements arranged in a cross shape on a region of a layer of an antenna substrate, and wherein the configuring mechanism comprises four switches configured to switch corresponding ones of said antenna elements between ground and a transmission line connectable to the RFID reader/encoder.

26. A method as in claim 25 wherein the antenna elements are arranged in an N×N grid of square-shaped elements formed as isolated conductive areas on a layer of a substrate.

27. A method as in claim 26 where the value of N is 2, 3 or 4.

* * * * *